Figure 12:
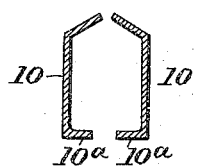

S. G. THOMSON.
LOCOMOTIVE.
APPLICATION FILED JAN. 23, 1915.
1,145,524.
Patented July 6, 1915.
4 SHEETS—SHEET 1.
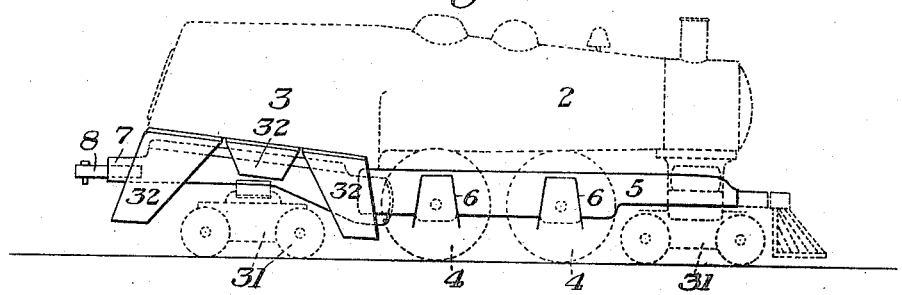
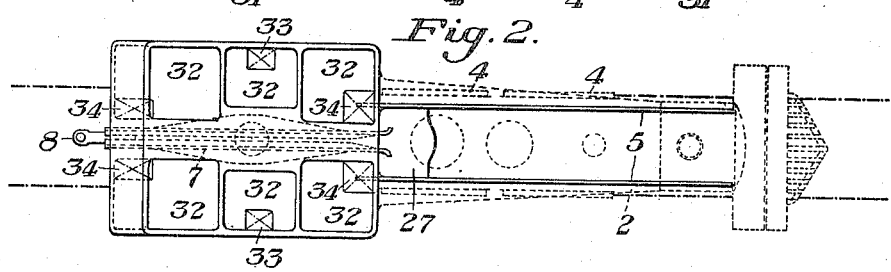
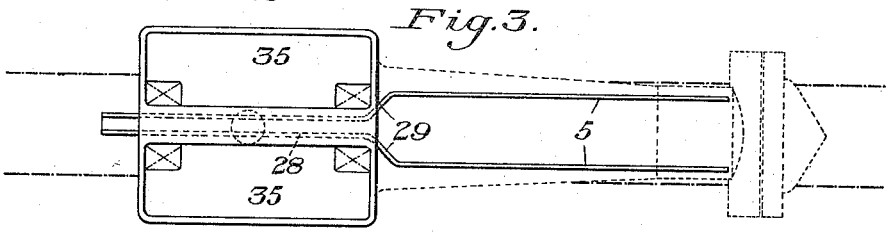
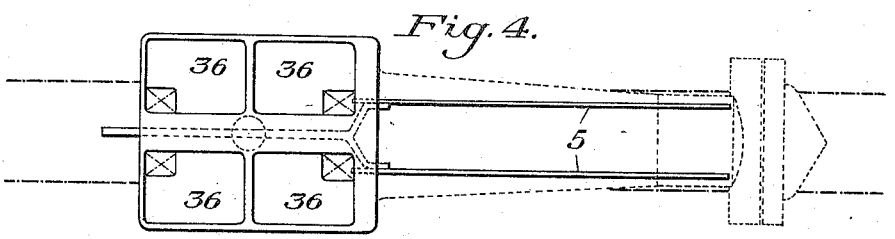
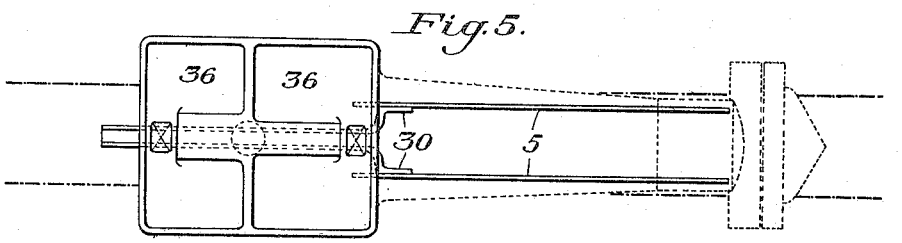

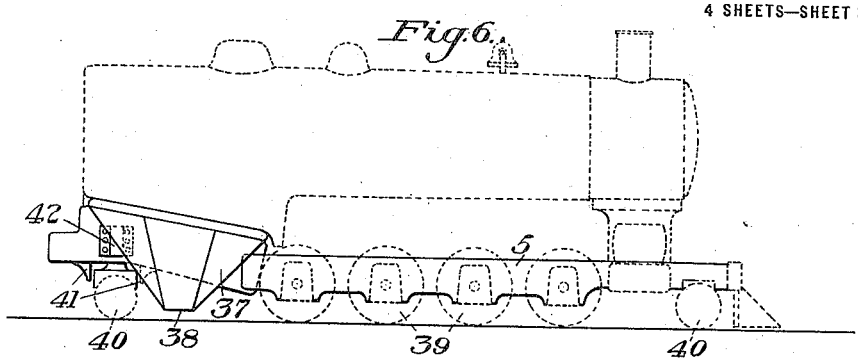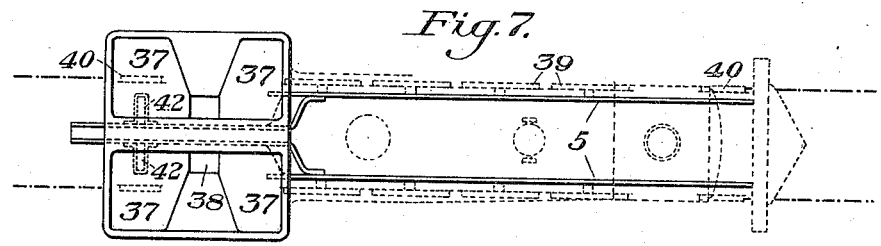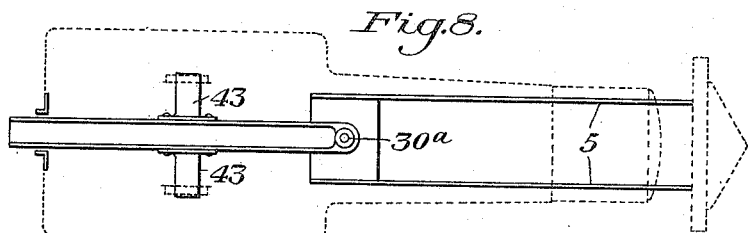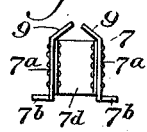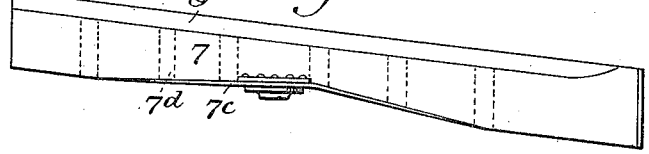

S. G. THOMSON.
LOCOMOTIVE.
APPLICATION FILED JAN. 23, 1915.

1,145,524.

Patented July 6, 1915.
4 SHEETS—SHEET 3.

WITNESSES
R. A. Balderson
H. M. Corvin

INVENTOR
S. G. Thomson,
by Bakewell, Byrnes, Parmelee
Attys.

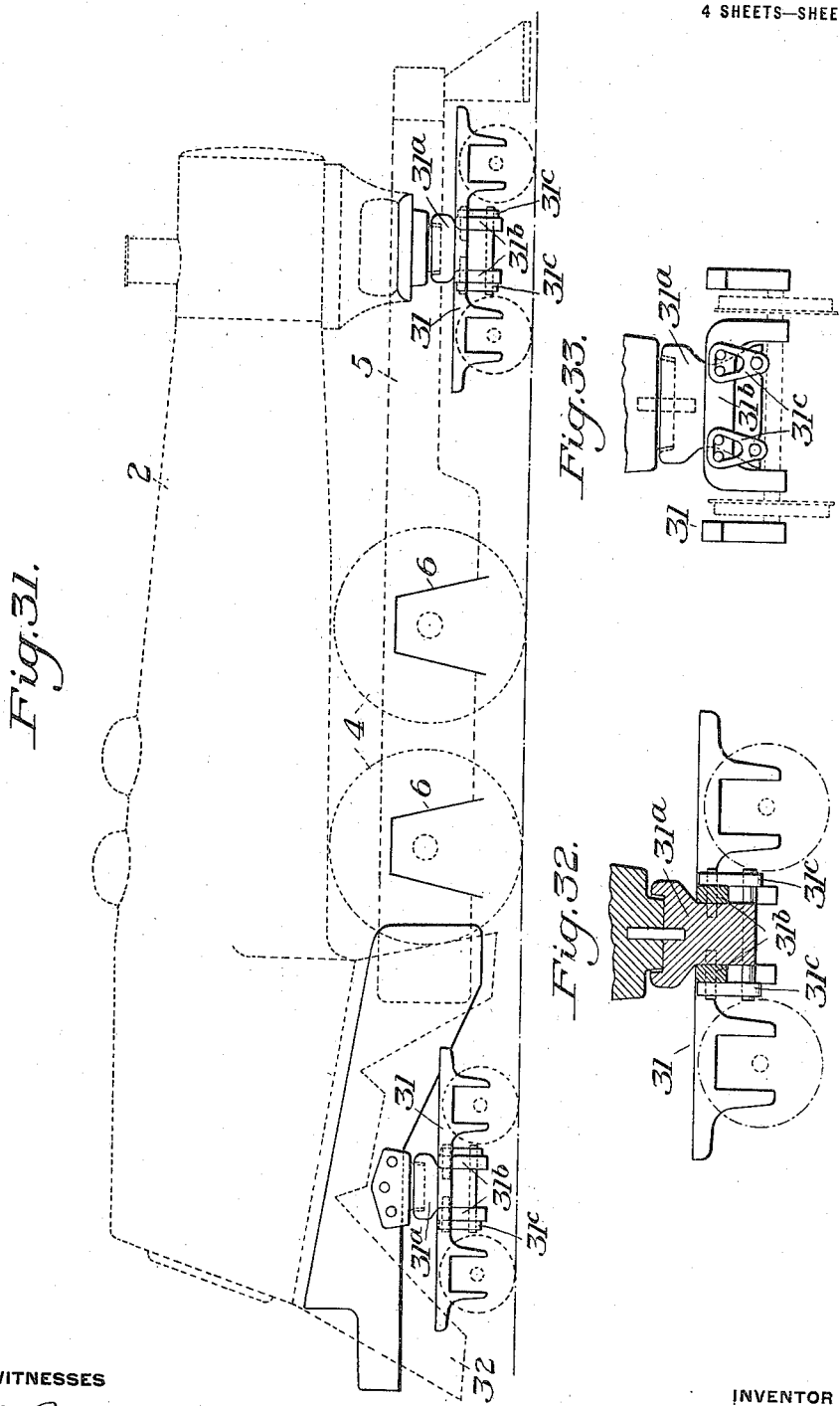

UNITED STATES PATENT OFFICE.

SAMUEL G. THOMSON, OF READING, PENNSYLVANIA.

LOCOMOTIVE.

1,145,524.  Specification of Letters Patent.  Patented July 6, 1915.

Application filed January 23, 1915. Serial No. 3,912.

*To all whom it may concern:*

Be it known that I, SAMUEL G. THOMSON, a citizen of the United States, residing at Reading, in the county of Berks and State of Pennsylvania, have invented a new and useful Improvement in Locomotives, of which the following is a full, clear, and exact description, reference being had to the accompanying drawings, forming part of this specification, in which—

Figure 1 is a side view, largely diagrammatic, showing a locomotive embodying one form of my invention. Figs. 2, 3, 4 and 5 are plan views, also largely diagrammatic, showing different modifications. Fig. 6 is a view similar to Fig. 1, showing still another modification. Figs. 7 and 8 are plan views, largely diagrammatic, showing other modifications. Figs. 9 and 10 are, respectively, plan and side elevations of the back frame member of Figs. 1 and 2. Fig. 11 is a cross section of said member, and Figs. 12 to 30, inclusive, are cross sectional views illustrating various different forms of construction of the back frame member. Fig. 31 is a view similar to Fig. 1, but showing the interchangeable trucks more in detail; Fig. 32 is a side view partly in section of one of the trucks; and Fig. 33 is an end view of the same.

My invention has relation to improvements in locomotives.

One of the main objects of my invention is to lighten the back end of the locomotive and to provide a suitable central bearing under the firebox for a small truck for the purpose of better distributing the necessarily great weights of large firebox boilers.

My invention also provides for a novel arrangement of the locomotive trucks; and also for a new and desirable arrangement of the firebox ash pans.

Other objects of my invention will be hereinafter referred to.

One of the principal features of my invention consists in the provision of a centrally located frame, constructed of one or more longitudinal members and which extends from the main frame underneath the firebox and to which the truck center plate and the back pulling member are directly connected. This back or tail frame may be either rigidly or pivotally connected to the main frame at a point adjacent to the front end of the firebox. It eliminates the necessity for heavy cross tie bolsters or tail castings, extending the full width of the locomotive at the central and rear portion of the firebox, such as are necessitated by the widely spaced back frames now generally used. It can also be made very much lighter than is possible with any arrangement of widely spaced frames which carry the strains in a roundabout way to the center plate and the back pulling member. This centrally located back or tail frame also readily lends itself to a convenient and desirable arrangement of the ash pans at either side thereof.

Figure 13:
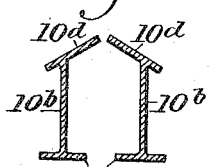
Figure 14:
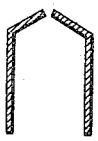
Figure 15:
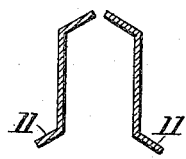
Figure 16:
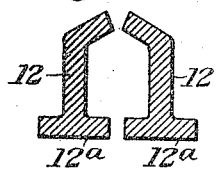
Figure 17:
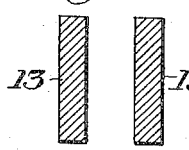
Figure 18:
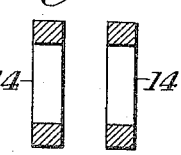
Figure 19:
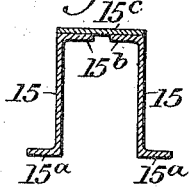
Figure 20:
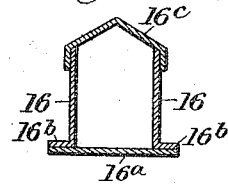
Figure 21:
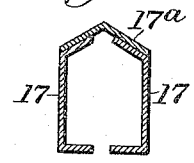
Figure 22:
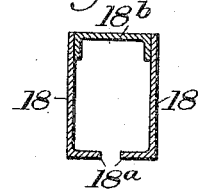
Figure 23:
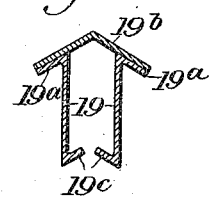
Figure 24:
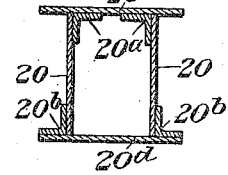
Figure 25:
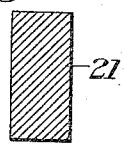
Figure 26:
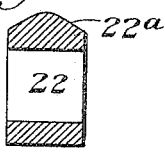
Figure 27:
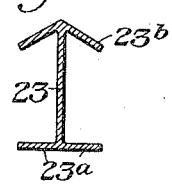
Figure 28:
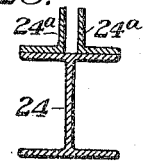
Figure 29:
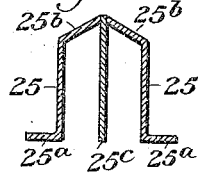
Figure 30:
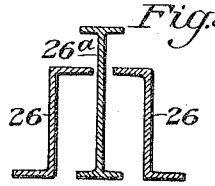

Referring first to that form of my invention shown in Figs. 1 and 2, the numeral 2 designates the barrel of the locomotive boiler, and 3 the firebox. 4 designates the driving wheels, two of which are shown at each side, although the invention is also applicable to locomotives having three or more drivers at each side. 5 designates the main frame of the locomotive which is shown as extending from a point just back of the rear driving wheel 4 forwardly to the front end of the locomotive. This frame may be in general of any suitable construction, preferably of cast steel, with its side members comparatively widely spaced from each other, as in the usual practice, the side members lying just inside of the drivers and carrying driving box guides 6. 7 designates the centrally located tail or back frame which, in the form shown in Figs. 1 and 2, extends rearwardly from a point just inside the rear drivers back underneath the full length of the firebox and having attached to its rear end the pulling or drawbar member 8. The construction of the frame 7 may be of any suitable character. I prefer to make it with outwardly and downwardly sloping upper portions 9 so that the ash pans located at the sides thereof can be arched over the frames without creating a flat surface near the grates. In the construction shown in Figs. 1, 2, 9, 10 and 11, said frame is composed of the two rolled side plates 7ᵃ, whose upper edges are bent inwardly to provide the outwardly sloping surfaces 9, and whose lower edge portions are bent outwardly to form the lateral stiffening flanges 7$^b$. These stiffening flanges need not be provided except at the central portion of the length of the frame, and may be shaped to form the long tapering gussets 7$^c$ which connect them to the vertical webs of the members. The two members are rigidly connected together, as by means of the spacers 7$^d$. The construction shown in Fig. 12 is similar to that just described except that the two members 10 composing the frame have their stiffening flanges 10$^a$ bent inwardly. In Fig. 13 the two members 10$^b$ are shown as having bottom flanges 10$^c$ projecting both inwardly and outwardly from the webs, and the outwardly sloping portions 10$^d$ at the top extended beyond the webs at their lower edges. Fig. 14 shows a construction in which the bottom stiffening flanges are omitted. Fig. 15 shows a construction in which the stiffening flanges 11 are bent downwardly and outwardly. Fig. 16 shows a modification in which the members 12 are of heavier cross section, the base flanges 12$^a$ being similar to the flanges 10$^c$ of Fig. 13. Fig. 17 shows a construction composed of two separate parallel members 13 without flanges at either top or bottom. Fig. 18 shows two side members 14 as consisting each of a top and bottom chord. The members shown in Figs. 16, 17 and 18 may either be castings or heavy plates. Fig. 19 shows a construction in which the two side members 15 have the outwardly bent stiffening flanges 15$^a$ at their lower edges with inturned flanges 15$^b$ at their upper edges and a top connecting plate 15$^c$ seated on said flanges. Fig. 20 shows two side members 16 connected by plate 16$^a$ seated against the under side of the outwardly turned stiffening flanges 16$^b$ with an angular top plate 16$^c$. Fig. 21 shows the side members 17 of the same form as in Fig. 12, but with a separate angular top plate 17$^a$ secured thereto. Fig. 22 shows two side members 18 having inturned flanges 18$^a$ at their lower edges and united at the top by a channel member 18$^b$. Fig. 23 shows two side members 19 having downwardly and outwardly turned flanges 19$^a$ at their upper edges seating the angular top plate 19$^b$ and having their lower edges formed with upwardly and inwardly bent stiffening flanges 19$^c$. Fig. 24 shows a construction in which the side members 20 are reinforced at the top and bottom by the angles 20$^a$ and 20$^b$, respectively, with a separate top plate 20$^c$ and separate bottom plate 20$^d$. Fig. 25 shows a construction in which the frame member consists of a central solid bar 21. Fig. 26 shows a similar construction, except that the bar is lightened at 22 and has the outwardly sloping top surfaces 22$^a$. Fig. 27 shows the frame made from a single rolled member 23 having the base flange 23$^a$ and the downwardly bent top flanges 23$^b$. Fig. 28 shows a single I-beam member 24 having the angles 24$^a$ seated on its top flange. Fig. 29 shows two side members 25 as having the outwardly turned stiffening flanges 25$^a$ at their lower edges, the upwardly inwardly bent top flanges 25$^b$, and also a central longitudinal member 25$^c$, whose upper edge fits between the inner edges of the flanges 25$^b$, and Fig. 30 shows a construction consisting of two rolled Z-members 26 with a central I-beam member 26$^a$. These various constructions are illustrative only, as it is obvious that this frame can be constructed or built in any one of a large number of ways. The provision of bottom flanges, particularly at the central portion of the length of the frame, not only greatly reinforces the frame at its central portion, where it is most needed, but also form an approximately flat bearing for a truck center plate. The sloping top which is present in the preferred constructions permits an ash pan lying over it to be constructed so as to shed its ashes at either side; and also gives a maximum depth to the frame within the limited space between the firebox grates and the truck center plate. Where this is formed by inwardly bent flanges, these also give a certain amount of elasticity to the construction, thereby reducing the tendency to develop cracks in the longitudinal members. In the form shown in Figs. 1 and 2 the back frame is shown as rigidly connected to the main frame 5 by an interposed casting 27. This, however, is not essential since, as shown at 28 in Fig. 3, said back frame members may form a continuation of the main frame members by giving the latter the inward offsets 29 adjacent to the front end of the firebox. It will also be obvious that where a rigid connection is desired between the two frames, this can be made in various ways. In Fig. 5 I have shown the front end portions 30 of the back frame members as spread laterally and secured to the inner sides of the rear portions of the side members of the main frame.

The novel principle underlying the invention, and present in all its forms, is the change from a wide main frame to a narrow back frame at a point adjacent to the front end of the firebox, for the purpose of lightening the construction, to provide for a four-wheel truck, such as shown at 31 in Fig. 1, being placed underneath the firebox; and to give ample clearance for an improved ash pan arrangement and for inspection around the wheels and truck parts. Additional advantages may be obtained by a pivotal connection between the back frame and the main frame, as shown, for instance, at 30$^a$ in Fig. 8. This pivotal connection allows the back frame to swing freely, or within such restricted limitations as may be provided for.

The ash pans are placed at each side of the back frame, the arrangement of this frame permitting the pans to extend outwardly, without obstruction, to the sides of the firebox. This is of very great advantage, especially on the wide firebox locomotives now generally used, in which the firebox flares out over the frames to a considerable distance and which requires flatly flaring ash pan sides. These flatly flaring ash pan side sheets are necessary in order to reach over the frames from deep pans located between them, to the outer edge of the firebox of such boilers. The result is that the flat portions, being located closely to the grates, quickly fill up with ashes and cause the grates to burn out, as well as exclude the admission of air under the grates. My centrally arranged back frame gives ample room for deep ash pans with either vertical or rapidly sloping sides, such as will carry the ashes to the bottom of the pans where they can all be dropped out of the openings instead of lodging on widely flaring sides. This construction of the ash pans also reduces their weight; and also eliminates the necessity for blowing down or scraping off the ashes from the flaring surfaces while emptying the pans at the terminal ash pits. It is obvious that any number of separate pans may be arranged along either side of the firebox. In Figs. 1 and 2 I have shown three pans 32 at each side of the back frame. The front pans on each side catch all the ashes dropped through the front drop grates while cleaning fires; the back pans catch the ashes dropped through the back drop grates; and the middle pans catch the rakings through the central portion of the firebox and are arranged to drop the ashes outside of the truck wheels 31 through the chutes 33 into ash buckets in pits between the track rails; or directly on the ground outside of the rails, or into any desired receptacle. The front and back pairs of pans can readily be arranged to drop the ashes into pits in front of and behind the truck 31 by the provision of the slide controlled discharges indicated at 34. In the arrangement shown in Fig. 3 there is a single ash pan 35 at each side of the central back frame; and in Figs. 4 and 5 two pans 36 are shown at each side of said frame. In Fig. 5 the two pans unite under the back frame. In the arrangement shown in Figs. 6 and 7 the front and back ash pan hoppers 37 are shown connected together in such a manner that a single central discharge opening at 38 will answer for both pans. The drawings are intended to represent diagrammatically the general location of the hoppers of these pans, and it is obvious that the details thereof, as well as their arrangement and number, may be widely departed from without departing from my invention.

Another novel feature of my invention embodied in the construction shown in Fig. 1 is the provision of the four-wheel truck 31, which can be used interchangeably, either underneath the front or the back end of the boiler, these two trucks being duplicates. This is shown more clearly in Fig. 31. This is accomplished by the central frame arrangement which directly provides the necessary bearing for the center plate. Trucks with the same swinging action located symmetrically both fore and aft of the rigid driving wheel base of the locomotive give a very smooth riding action. Detail views of trucks of this character are shown in Figs. 32 and 33. In these figures, 31$^a$ designates the bolster which is swung between the transom bars 31$^b$ by means of the links 31$^c$. The swinging bolsters may, however, be of any well known or usual type, as they form no part of my invention except in combination.

In the modification shown in Figs. 6 and 7, four driving wheels 39 are employed at each side with a two-wheel truck 40 in front of and back of the drivers. Although I prefer to use interchangeable trucks, as above described, it is obvious that any suitable arrangement of trucks may be employed. That is to say, I may use trucks with any desired number of wheels both in front and at the rear of the drivers.

As my improved back frame allows ample room for ash pans when using a four-wheel truck under the firebox, which is the most difficult condition to meet; it is obvious that this improvement is more readily used in connection with the two-wheel truck, which gives a greater space for the ash pans. With such a truck the pans may be located entirely ahead of the truck, as shown in Figs. 6 and 7; or they may be arranged in various ways with respect to this truck.

An important advantage of my invention is that either two-wheel or four-wheel trucks may be employed in almost any location adjacent to the front of the firebox, intermediate, or even out behind the firebox, if the ash pans require so much space as to make this necessary.

In Fig. 6, I have shown the back frame as having downwardly projecting guides 41 to engage the sides of the truck. Said frame may have laterally projecting arms 42 (Figs. 6 and 7) or 43 (Fig. 8), which may be used either to provide side bearings, or as a means of attaching a truck to said frame. These arms, in effect, form what may be termed a box bolster. The guides 41 may be either rigidly carried by the back frame itself, or may be attached thereto in any other suitable manner.

I claim:

1. A locomotive having side frames extending along each side adjacent to the driving wheels, and terminating under the front end of the firebox, and also having a frame extending the length of the firebox under the central portion thereof.

2. A locomotive having the front portion of its firebox superimposed on widely-spaced forwardly-extending frames, and having closely-spaced frame portions extending backward for substantially the full length of the firebox.

3. A locomotive having the front portions of its frames widely separated and lying adjacent to the driving wheels, and the back portions lying close together for the full length of the firebox, the firebox of said locomotive lying entirely above said front portions of the frame.

4. A locomotive having a portion of its frame located under the firebox, and another portion lying underneath the barrel of the boiler, said frame portion under the firebox lying adjacent to a longitudinal vertical plane through the middle of the firebox for substantially the full length of the firebox.

5. A locomotive having a portion of its frame lying adjacent to a longitudinal vertical plane through the middle of its firebox, for the full length of said firebox, and another portion of its frame extending under the barrel of the boiler, the upper edge of said portion lying substantially in the same plane as the portion under the firebox.

6. A locomotive having a firebox resting on, and lying entirely above a main frame extending forward from the front of said firebox, and also having a tail frame extending backward from the front of the firebox and adjacent to a vertical longitudinal plane through the middle of the firebox.

7. A locomotive having a main frame and a tail frame the upper edges of said frames lying in substantially the same longitudinal plane, said tail frame extending longitudinally under the locomotive firebox and adjacent to a vertical longitudinal plane through the middle of the firebox.

8. A locomotive having a cast steel main frame, with top and bottom rails and terminating adjacent to the front portion of the firebox; and also having a rolled-steel centrally-located back frame extending from the termination of the main frame to the back of the locomotive.

9. A locomotive having a frame a portion of which frame passes between two ash pans located under opposite sides of the firebox, said pans extending inside of the inner face of the driving wheels of the locomotive.

10. A locomotive having a trailing truck underneath its firebox and two separate ash pans located under opposite sides of the firebox, each of said pans having a portion of its discharge opening located inside of the inner face of the driving wheels.

11. A locomotive having a portion of its frame lying adjacent to a longitudinal vertical plane through the firebox for the full length of the firebox, and having separate ash pans on each side of said frame portion.

12. A locomotive having a frame extending longitudinally under the firebox, said frame being supported directly on a truck center plate.

13. A back frame for locomotives comprising two members lying adjacent to each other and rigidly fastened together, said members having integral stiffening flanges extending along their edges and lying at an angle to the vertical.

14. A back frame for a locomotive, having a flange extending along its top for a substantial portion of its length and projecting laterally at an angle between the vertical and the horizontal.

15. A back frame for a locomotive, having an integral laterally projecting flange extending along its lower edge for a substantial portion of its length.

16. A back frame for locomotives, pressed from a flat sheet, with its upper portion bent at an angle to the vertical for a substantial portion of its length, and having its lower portion bent laterally, in the opposite direction, along the mid portion of its length.

17. A locomotive frame having a vertical web portion, the lower edge of said web portion being turned outwardly to a substantially horizontal position, adjacent to the mid portion of its length, the lateral flange of said mid portion being connected to the vertical end web portions by long gussets.

18. A locomotive having a frame extending longitudinally under the central portion of its firebox and having a four-wheel truck under its front end, and another four-wheel truck under its back end, said trucks being interchangeable one with the other.

19. A locomotive having a boiler rigid throughout its length and having a four-wheel truck under its front end and another four-wheel truck under its back end, the frame of the locomotive having a portion extending centrally under the firebox of the locomotive, each of said trucks turning on a center pin and also permitting a lateral swinging action to the locomotive, the center pin for the rear truck being carried by the frame portion underneath the firebox.

20. A locomotive having a boiler rigid against cross bending, and a frame extending longitudinally under the central portion of its firebox, and having two laterally swinging center-bearing four-wheel trucks, one truck under its front end and one under its firebox, said trucks being interchangeable one with the other.

21. A locomotive having two trucks with laterally swinging bolsters, said trucks being located fore and aft of a series of driving wheels forming the rigid wheel base of the locomotive, said locomotive having its supporting frame, extending from the front to the back of the firebox, lying adjacent to a vertical longitudinal plane through the center of the locomotive.

22. A locomotive having a main frame extending under the barrel of the locomotive boiler, and a back frame arranged centrally underneath the firebox of the locomotive and pivotally connected to the main frame at its forward end.

23. A locomotive having a main frame extending under the barrel of the locomotive boiler, and a back frame arranged centrally underneath the firebox of the locomotive and pivotally connected to the main frame at its forward end, said back frame having a central bearing for a truck.

24. A locomotive having a main frame extending underneath the barrel of a locomotive boiler and carrying the drivers, a truck underneath the forward end portion of said frame in front of the drivers, and a back frame arranged centrally underneath the firebox, and a four-wheel truck underneath said back frame.

In testimony whereof, I have hereunto set my hand.

SAMUEL G. THOMSON.

Witnesses:
J. I. BEST,
HARRY EGOLF.

Copies of this patent may be obtained for five cents each, by addressing the "Commissioner of Patents, Washington, D. C."